Patented Apr. 3, 1951

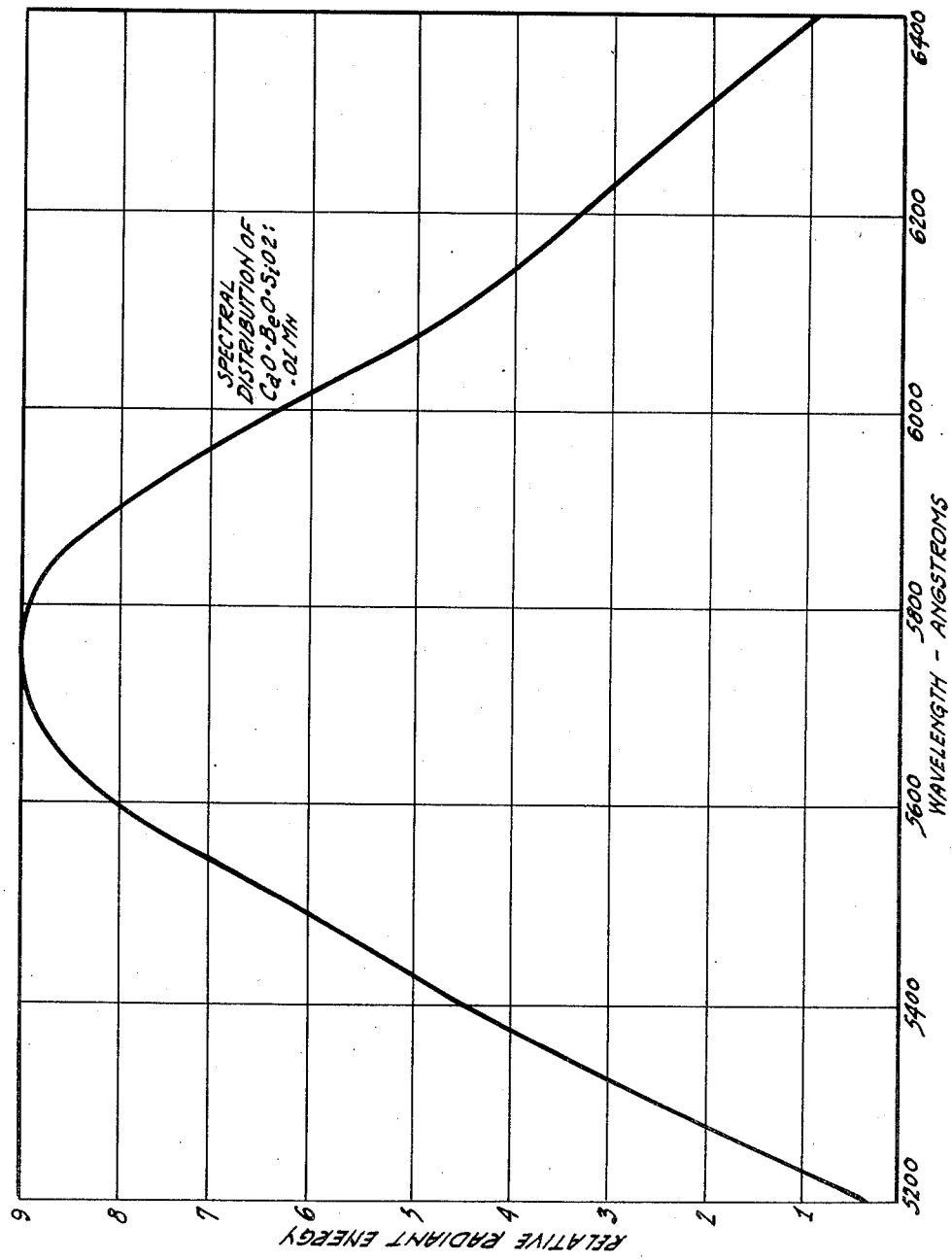

2,547,790

UNITED STATES PATENT OFFICE 2,547,790

CALCIUM BERYLLIUM SILICATE PHOSPHOR

Arthur L. J. Smith, Lancaster, Pa., assignor to Radio Corporation of America, a corporation of Delaware Application April 12, 1949, Serial No. 86,992

3 Claims. (Cl. 252—301.4)

This invention relates to a novel luminescent material adapted to emit light within the visible spectrum when subjected to cathode ray excitation. The new material may be described as a manganese activated calcium beryllium silicate.

Many different types of silicate phosphors have been prepared in the past and some of these have been widely used in commercial apparatus such as television kinescope tubes because of their excellent stability, high efficiency, and desirable spectral emission characteristics. The novel material of the present invention is a luminescent silicate composition not previously known to have been prepared and which has certain desirable properties such as unusually long decay time.

One object of the present invention is to provide a novel luminescent material adapted to emit within the visible region of the spectrum when excited by cathode rays.

Another object of the invention is to provide a novel cathodoluminescent material having a fairly long decay time.

Another object of the invention is to provide a novel luminescent material characterized by relative simplicity of preparation.

Still another object of the invention is to provide a novel luminescent material having relatively high efficiency and good stability.

Other objects and advantages of the invention will be more apparent and the invention will be more readily understood from the following description and the accompanying drawings of which the single figure is a curve showing relative emission, at room temperature and within the visible spectrum, of a particular preferred composition encompassed within the scope of the present invention.

The novel material of the invention may be described briefly as being a calcium beryllium silicate activated with small amounts of manganese. The material may be further characterized as being a crystalline structure consisting essentially of calcium-beryllium orthosilicate activated with manganese and may incorporate, as solid solutions, large quantities of the calcium silicates or beryllium silicate, which may be more simply described as being an excess of silica over the proportion $CaO.BeO.SiO_2$. It may also exist with a slight deficiency of silica, all as more fully explained hereinafter. It should be further understood that the material is not a mere physical mixture of calcium orthosilicate and beryllium orthosilicate but is rather a homogeneous crystal consisting essentially of manganese activated calcium orthosilicate and beryllium orthosilicate in a single lattice structure which may include an excess or a deficiency of silica compared with that required by the stoichiometric ratio $CaO.BeO.SiO_2$.

A more exact formula for the novel luminescent material of the invention may be given as $x(CaO)y(BeO)z(SiO_2)$:Mn, the $x$, $y$ and $z$ standing for molar proportions such that $x$ is preferably equal to about 0.25 to 1, $y$ is preferably equal to about 0.25 to 1.6, both of these ratios being true when $z$ is equal to 1 and when the additional limitation is imposed that $$\frac{x+y}{z}$$

is not less than about 0.5 nor greater than about 2.1. The manganese, as is usually the case with activators, is present in relatively minor amounts. Preferably, the proportion is from about .001 to 0.2 mole in any of the compositions defined above.

Although satisfactory materials may be prepared using any proportion of the constituents as indicated above, the most efficient material has been found to be one having the molar ratios $CaO.BeO.SiO_2$:.01 Mn; that is, one in which the three principal constituents are present in equimolecular proportions, with the manganese activator being present in the proportion of .01 mole.

The preparation of the novel materials of the present invention is relatively simple. The raw materials must be carefully purified to an exceedingly high degree of purity. They are powdered in a ball mill and thoroughly mixed to obtain homogeneity, then fired at a temperature which is preferably about 1250° C. but which may be between 1000° and 1500° C. The time of firing may be from ½ to 4 hours, a period of about 2 hours being preferred. The firing may take place in air, nitrogen or hydrogen. Firing may also take place in the presence of steam and, if steam is used, the optimum firing time is shortened. The steam appears to act as a catalyst and is especially desirable if the materials are fired in an atmosphere of hydrogen.

Calcium chloride may be used as a flux but the firing can readily be accomplished without any flux.

The purified compounds out of which the luminescent material is synthesized are, preferably, the oxides or those compounds which will decompose to form the oxides under the firing conditions used. Mention may be made of carbonates, nitrates, hydroxides, sulfates, etc. It has been found most convenient to use calcium carbonate, manganous carbonate, beryllium oxide, and silicic acid. However, any combinations which, upon reaction during the firing process, form the ultimate required composition may be employed. Thus, for example, even calcium chloride may be used as a medium to introduce calcium provided enough excess silica is used to account for the amount that will be lost through volatilization of silicon-chlorine-(oxygen) compounds. When the chloride is used, firing is best accomplished in an oxidizing atmosphere, but this is not essential.

The manganese activator can be added to the raw material mix as the sulfate, carbonate, fluoride, oxide, nitrate, chloride, etc.

Although the novel material of the invention is preferred in silicate form, it is possible to substitute either germanium or tin for part of the silica. It has been found, for example, that up to .2 of a mole of the silica can be replaced by an equal molar quantity of either germanium dioxide or stannic oxide in any of the compositions.

Depending upon the particular ratio of the constituents selected, the peak wavelength of emission of the material under excitation by cathode ray bombardment varies somewhat. For the preferred composition containing equal molecular ratios of CaO, BeO and SiO$_2$, the peak wavelength is about 5700 Å and this shifts toward the red wavelengths as the $$\frac{CaO + BeO}{SiO_2}$$

molar ratio approaches one or less. The maximum amount of the shift brought about in this manner is about 500 Angstroms with the molar ratio 2CaO.BeO.3SiO$_2$. A complete spectral emission curve within the visible spectrum for the material CaO.BeO.SiO$_2$:.01 Mn is shown in the figure. The data were taken at ordinary room temperature of about 72° F.

There has thus been described a novel luminescent material adapted to be excited by electron bombardment. The material is characterized by rather long decay time, thus making it especially suitable for such practical applications as radar tube screens although its decay time is not too long for use in many other types of cathode ray tube apparatus. It, also, has relatively high efficiency of emission and good stability under the usual conditions of use, as well as the added advantage of ease of preparation.

I claim as my invention:

1. A luminescent material having the general formula $x$(CaO)$y$(BeO)$z$(SiO$_2$):Mn where $x$ is 0.25—1 and $y$ is 0.25—1.6 when $z$ is 1, where the molar ratio $$\frac{x+y}{z}$$

is about 0.5 to 2.1, and in which the molar concentration of Mn is from about 0.001 to about 0.2.

2. A material according to claim 1 in which up to 0.2 mole SiO$_2$ is replaced by GeO$_2$.

3. A material according to claim 1 in which $x$, $y$ and $z$ are each equal to 1 and the molar concentration of Mn is equal to 0.01.

ARTHUR L. J. SMITH.

REFERENCES CITED

The following references are of record in the file of this patent:

UNITED STATES PATENTS

| Number | Name | Date |
|---|---|---|
| 2,049,765 | Fischer | Aug. 4, 1936 |
| 2,118,091 | Leverenz | May 24, 1938 |
| 2,457,054 | Leverenz | Dec. 21, 1948 |